Dec. 15, 1959     O. H. RAMO     2,917,076
SURGE CONTROL DEVICE AND PNEUMATIC SYSTEMS CONTAINING THE SAME
Filed Sept. 6, 1955     3 Sheets-Sheet 1

Inventor,
Oliver H. Ramo,
by Dike, Thompson & Sanborn
Attys.

Dec. 15, 1959  O. H. RAMO  2,917,076
SURGE CONTROL DEVICE AND PNEUMATIC SYSTEMS CONTAINING THE SAME
Filed Sept. 6, 1955  3 Sheets-Sheet 2
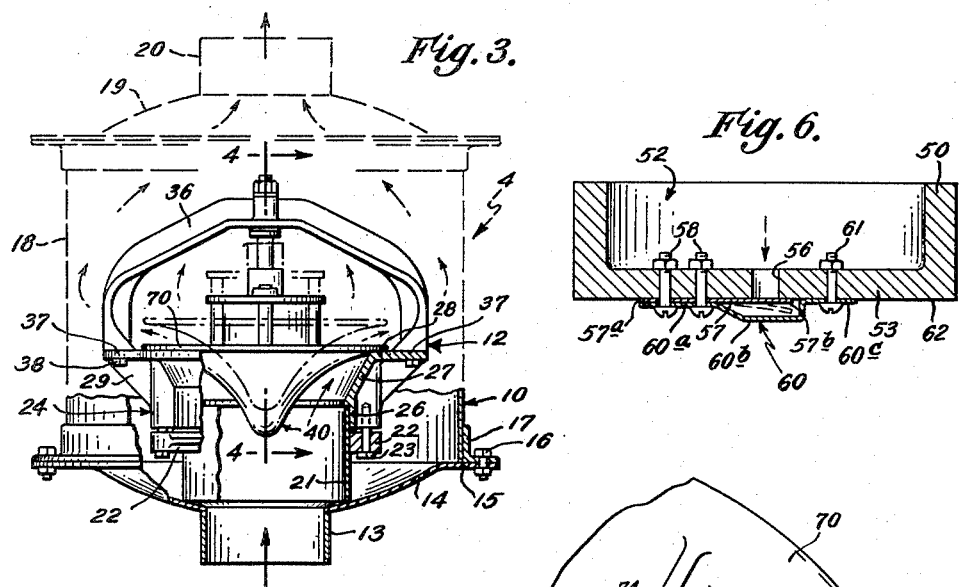
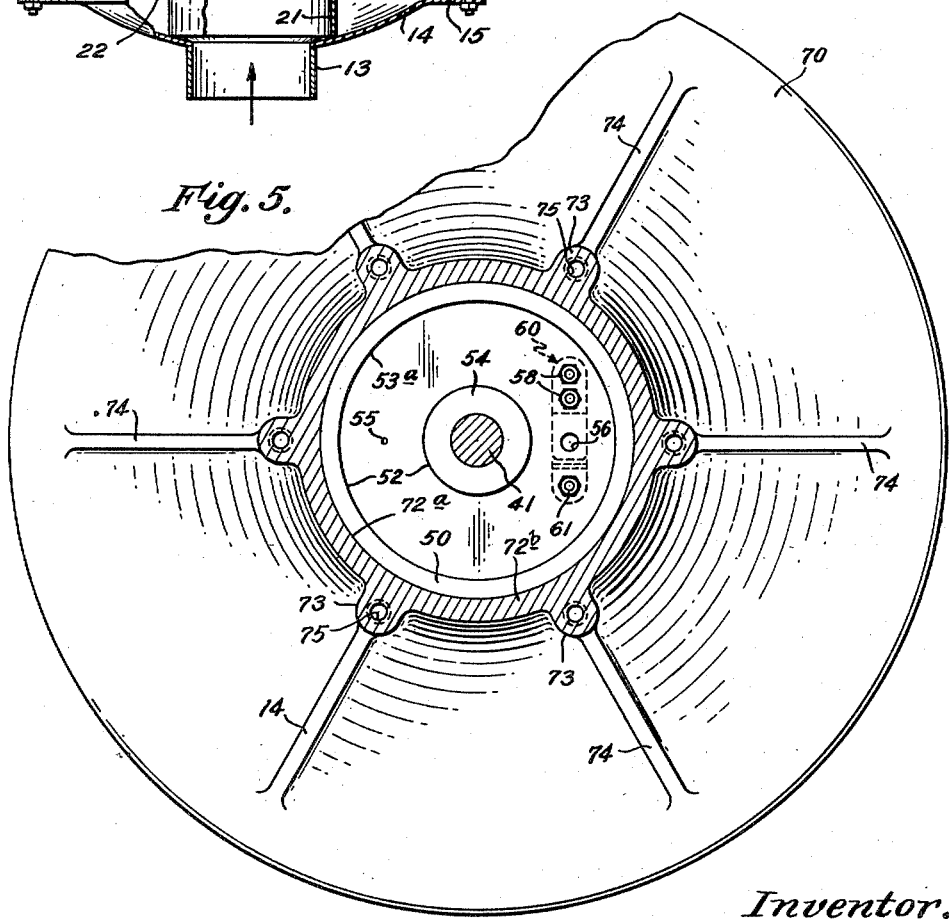
Inventor,
Oliver H. Ramo,
by Dike, Thompson & Sanborn
Attys.

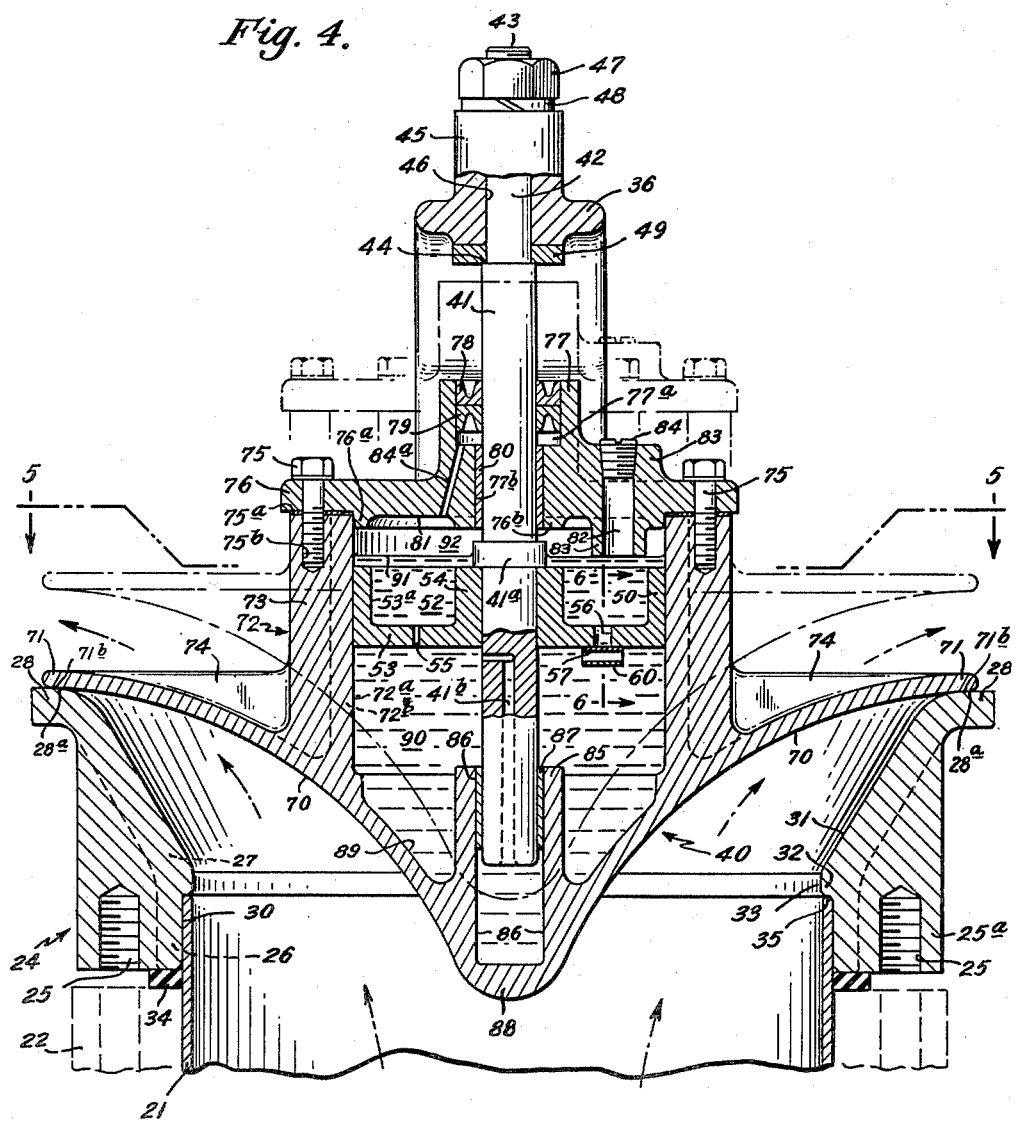

United States Patent Office 2,917,076
Patented Dec. 15, 1959

2,917,076

SURGE CONTROL DEVICE AND PNEUMATIC SYSTEMS CONTAINING THE SAME

Oliver H. Ramo, North Abington, Mass., assignor to Abington Textile Machinery Works, Abington, Mass., a Massachusetts trust Application September 6, 1955, Serial No. 532,421

2 Claims. (Cl. 137—514.3)

The present invention relates to pneumatic vacuum and blower systems utilizing gas pumps which have the characteristic of developing flow surges at reduced loads, as for example, centrifugal gas pumps, especially multi-stage centrifugal pumps, and axial flow fan-type pumps. The most common types of pumps which have such a characteristic are rotary, non-positive displacement type pumps. More specifically, the present invention relates to devices for reducing and eliminating the forward and backward flow surges and "shriek" which normally occur in such systems at reduced loads and to pneumatic systems having such devices incorporated therein.

Centrifugal pumps, especially multi-stage centrifugal gas pumps are used with pneumatic piping systems for removing and conveying, by means of vacuum, various loose industrial wastes, or bulk materials, such as cotton, sawdust, grain, ashes, etc. The centrifugal pump is employed to create and maintain adequate vacuum in the suction piping system. Various valved openings into the system permit atmospheric air to flow thereinto. The velocity of the atmospheric air as it is pulled into the piping system by the vacuum is fast enough to carry with it loose or bulk material and convey these materials into a receiving tank. This receiving tank is usually located in the suction piping system ahead of the pump. The material, in transit with the flowing air in the piping system, is separated from the air and remains in this tank. The air then flows through a filter which removes the finer particles of dust. This filter may be either built into the receiving tank or it may be located in a section of the piping between the receiving tank and the pump. The air, after flowing through the filter, flows to the pump which blows it back into the atmosphere. A centrifugal pump acting in this capacity is sometimes referred to as an exhauster. An axial flow, fan-type pump can be used for the same purpose and when so used would also be called an exhauster.

The total amount of work done by this type of system varies in accordance with the total amount or mass or weight of air which is capable of being moved through the openings which in turn depends on the sum of the cross sectional areas of all of the valve openings, of the valves which are open for the flow of air. For any given system, in which the valves are normally either fully open or shut, the total mass of gas capable of moving through the openings may be said to vary with the number of valves which are open. So long as the rate of flow through the openings is below the maximum rate which the pump is designed to handle the pump will move therethrough the total amount of air which passes into the system through the openings at a mean flow rate which is equal to the mean total flow rate through all the openings. Although the mean rate of flow through the pump and system is the same as the mean total flow rate through the openings and remains substantially constant for any particular condition of the openings, the actual flow rate through the pump and system under reduced load conditions fluctuates widely above and below this mean rate unless means are provided for preventing these fluctuations. The total amount of gas being pulled into the system through the openings and thereby moved by the pump is sometimes referred to as the load on the system or pump.

Centrifugal gas pumps are also used to supply volumes of forced air in various operations as for example in blast furnaces or cupola operations where air is blown through a layer of fuel. In applications of this nature, the same type of centrifugal pump is employed, its function being to take in free air from the atmosphere and blow it under slight positive pressure through a piping system having valved openings leading to the blast furnaces or cupolas. The pump when so used is commonly referred to as a blower. Axial flow, fan-type pumps would also be referred to as blowers when used in this capacity. These pumps are also used as blowers to agitate liquids, as in the manufacture of raw water, ice, yeast, oil and asphalt in petroleum refineries, and raw sewerage in activated sludge processes. In these applications, the amount of air, under pressure, delivered by the pump to the valved openings depends on the total amount of air capable of flowing through the openings, which in turn depends on the sum of the cross sectional areas of all of the valve openings of the valves which are open, or in practice, where the valves are usually either fully open or shut, on the number of valves which are open. The pump will move therethrough the amount of air which passes through the openings at a mean rate of flow equal to the mean total rate of flow through all the openings. However, as in a vacuum system, the actual flow rate through the pumps fluctuates widely at reduced loads unless means are provided to prevent this from occurring. Also as in a vacuum system the total amount of air passing through the openings is referred to as the load on the pump or system.

One of the characteristics of centrifugal pumps as well as other non-positive displacement pumps such as the axial flow fan-type pump, is that the greatest pressure differential (difference in pressure between the outlet and inlet of the pump) which they can develop varies in accordance with the rate of flow of air through the pump or the load in accordance with the curve shown in Fig. 2. At rates of flow through the pump from 0 up to a certain rate of flow $b$ (see Fig. 2) the pressure differential capable of being developed increases as the amount of air moved through the pump (load) increases until it reaches a maximum amount at rate $b$ after which the pressure differential capable of being developed decreases as the rate of flow increases up to the maximum rate $c$ which the pump is designed to handle.

From rates of 0 up to $b$ (that part of the curve where the pressure differential increases with or remains constant with, any slight increase in flow rate and marked "stable zone" in Fig. 2) the movement of gas by the pump is accompanied by slight pressure waves or pulsations which follow a definite rhythmic pattern within the casing of the machine. At rates of flow above $b$ (that part of the curve where the pressure differential decreases with any slight increase in flow rate and marked "stable zone" in Fig. 2) these pulsations or pressure waves do not occur.

A possible explanation of why pulsations occur at rates below $b$ and not above $b$ is as follows:

When atmospheric air is free to pass both out of and into the pump, the pump will move air therethrough at the maximum rate $c$ which it is designed to handle. When the inlet of the pump is restricted so that the rate of flow of air into the pump is less than the maximum designed rate $c$ which the pump is capable of handling, the pump in trying to maintain its maximum designed rate will try to move in addition to the restricted amount of air permitted to flow thereinto, residual air which is present in the inlet part of the pump casing between the impellors and the restriction into the casing. So long as the rate of flow through the restriction to the impellors is above $b$ the pump cannot successfully do this, probably because at such a rate the internal friction is great enough to resist it, and consequently the rate of flow through the pump remains the same as the rate of flow through the restriction into the casing.

However, if the rate of flow into the pump is restricted to a rate below $b$, for example, to a rate $d$ (see Fig. 2), the pump is successful in doing this probably because there is insufficient friction at such a rate to prevent it. In pulling this residual air therethrough in addition to the amount of air flowing into the restriction, the rate of flow through the pump is necessarily increased above $d$ to $e$. The consequent removal of residual air from the portion of the pump casing between the impellors and the restriction into the casing causes a decrease in air density and produces a greater vacuum in such portion of the casing. At the increased rate $e$ through the pump a pressure differential $x$ is developed. Eventually there is insufficient residual air to permit this increased rate of flow $e$ to be maintained, whereupon the rate of flow through the pump drops incrementally to $f$. At this reduced rate the greatest pressure differential which the pump can develop is $y$. However, the actual pressure differential between the inlet and outlet sides of the impellors at that time is $x$ which is greater than $y$. Consequently the centrifugal action of the pump breaks down or is overcome and there is a backward rush or surge of air in a reverse direction through the pump at least until the actual pressure differential between the inlet side and outlet side of the impellors is reduced to an amount at which the centrifugal action of the pump is again established. This backrush of air in addition to the air which is flowing through the restriction into the pump casing during this back flow replaces residual air which was formerly removed from the above mentioned portion of the casing. When the centrifugal action of the impellors is again established the pump again works on the residual air then in that portion of the casing to increase the flow rate through the pump above the rate at which gas can flow to the pump through the restriction, which again causes a backward rush of air. This increase in flow after termination of the backrush of air takes the form of a forward rush or surge of air. Thus under these conditions there is a continuous surging back and forth of air and a continuous fluctuation in rate of flow through the pump and system. However, so long as the size of the restriction remains constant the mean rate of flow through the pump is positive, does not vary appreciably and is equal to the mean rate of flow through the restriction. These rate fluctuations are known as pulsations and occur in a definite rhythmic cycle, so that the actual rate of flow through the pump cyclically fluctuates above and below the mean rate of flow, as well as above and below 0 rate of flow. The fluctuations in rate above the mean rate are called positive fluctuations whereas fluctuations below the mean rate, including decreases and increases in rate of forward flow below the mean rate, and backward flow, are called negative fluctuations. The only difference between pulsations and surges is the magnitude of the forward and backward rushes of air.

As a result of this phenomena a certain amount of air keeps surging forward and backward through the pump and system uselessly, while only an amount of air equal to what flows into the restriction is moved out of the system without an equal amount of back flow. The amount of air surging back and forth uselessly and consequently the magnitude of the surges depends on the amount of residual air there is for the pump to work on.

If the volume of the portion of the casing between the restriction and the impellors is small, the amount of residual air available for the pump to work on is small and the actual amount of air carried forward during the forward rush over and above the air flowing into the restriction and consequently the amount of air flowing backwards during the backrush are small, whereby the magnitude of the surges (amplitude) is small. The rate of forward flow can be increased only by the small available amount of residual air. Furthermore, because there is only a small amount of residual air it takes a very short time for it to be moved out of the portion of the casing between the restriction and impellors before the backrush starts and a very short time for sufficient air to flow backward during a backrush before the centrifugal action of the pump is re-established so that the surges are short in duration but are frequent (the frequency of the surge cycle is great).

However, in a pneumatic system in which the inlet of the pump is connected to a pneumatic piping system having a large volume there is a large amount of residual air in such piping system for the pump to work on and consequently a large amount of air is forced back and forth uselessly through the pump so that the pulsations or slight surges which occur with a restriction in the inlet of the pump casing are magnified into cyclic flow surges of substantial magnitude back and forth through the pump and system. If the volume of the piping system is greater, the amount of residual air which surges forward and consequently the amount of air which surges backward is greater and the magnitude (amplitude) of the surges is greater. Since there is more residual air to flow it flows for a longer time and hence the frequency of the cyclic surges is less. The backward rush of air is so great in these pneumatic systems that it makes an unpleasant noise called "shriek." Since a "shriek" occurs for each backward rush of air a series of "shrieks" is produced.

If the total size of the openings is changed by opening or closing a valved opening so that the amount of air flowing into the piping system through the openings is changed, the magnitude of the surges will change, the heaviest surges taking place when the rate of flow is 0 and growing lighter as the flow increases. This is true because the ratio of air uselessly moving back and forth through the pump to the actual amount of air which moves through the pump without an equal amount of backflow, becomes greater when the rate of flow through the openings is less. When the rate of flow reaches $b$ where the maximum pressure is developed, the surges no longer exist. Rate $b$ then is the maximum rate at which surging or pulsations normally occur.

A forward, positive surge usually refers to the rush of air in a forward direction through the pump while a backward, negative surge refers to the rush of air backwardly through the pump.

This same phenomena occurs whether the inlet or the outlet of the pump is restricted or whether the inlet or outlet of the pump is connected to the piping system, except that when the outlet is restricted the pump works on and compresses the residual air in the outlet portion of the pump casing between the impellors and such restriction and when the piping system is connected to the outlet of the pump, the pump works on and compresses the residual air in such piping system.

The surges which occur in a piping system also show up as surges in the power requirements of the machine and tend to shorten the life of the driving coupling or other transmission gear. The surges also produce an intermittent thrust load on the impellor shaft bearings, shortening the operational life of the machine.

This surge condition in pneumatic piping systems using centrifugal pumps can be eliminated by "bleeding" air into the system in the case of a vacuum system and out of the system in the case of a blower system. By doing this the amount of air flowing through the system is not permitted to drop into the "surge zone." Additional openings added to those needed for useful operation are intentionally made in the piping system these being always open to assure that the rates through the pump will at all times be above maximum rate $b$ at which pulsations and surges normally occur. This "bleeding" of additional air performs no useful work in the piping system other than insuring sufficient flow to prevent surge. The elimination of the surge in this manner is accomplished at the expense of power and performance.

It is an object of this invention to provide a self-contained automatic unit which will reduce and eliminate these forward and backward surges during operation at reduced loads and the inherent undesirable effects caused thereby without impairing the performance of the pump.

A further object is to provide a valve device which will prevent "shriek" in pneumatic systems having centrifugal pumps.

A further object is to provide a valve device which will throttle forward and backward surges in a gas pump which has the characteristic of developing such surges at reduced loads.

A further object is to provide a valve unit which will reduce such surges and which will automatically accommodate changes in load.

A further object is to provide a valve device for automatically stabilizing the rate of flow through a centrifugal pump without increasing the mean rate of flow therethrough above the maximum mean rate $b$ where surging normally occurs and which automatically accommodates changes in load (mean rate of flow).

A still further object is to provide an improved valve device.

A still further object is to provide a pneumatic system including such valve devices and units.

In the drawings which illustrate one embodiment of the present invention and wherein like reference characters are used to designate like parts;

Fig. 3 is an elevation of the surge control device of the present invention with parts broken away.

Fig. 4 is a section taken along the lines 4—4 of Fig. 3.

Fig. 5 is a section taken along the line 5—5 of Fig. 4, and

Fig. 6 is a section taken along the line 6—6 of Fig. 4.

Figure 1:
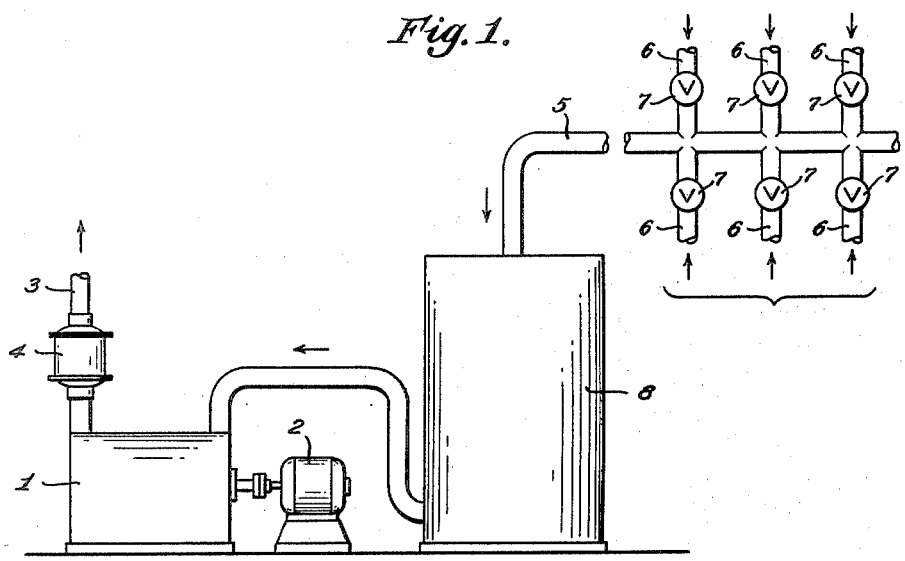
Fig. 1 is a schematic showing of a typical suction system for producing suction at a variety of stations or openings in a plant.
Figure 2:
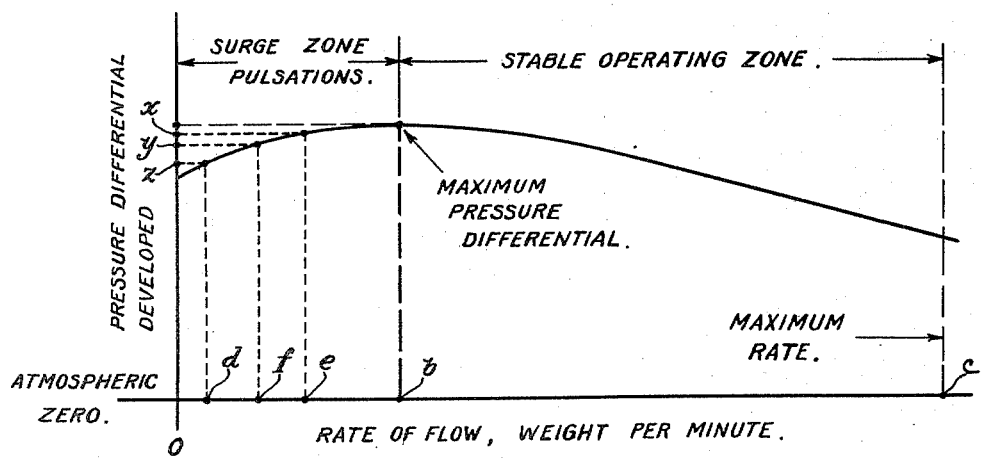
Fig. 2 is a chart showing the relationship of pressure differential which a centrifugal pump can develop to rate of flow through such pump.

In Fig. 1 there is shown a conventional multi-stage centrifugal vacuum pump 1 driven by a conventional motor 2, and having a conventional discharge pipe 3 passing to the atmosphere. Between discharge pipe 3 and pump 1 there is located a novel anti-surge valve unit 4 which will be described more particularly hereafter.

The suction side of the pump includes main suction pipe 5 having a plurality of branch pipes 6, each of which has a shut-off valve 7 therein and leads to a vacuum device, for example, a card cylinder and doffer cylinder suction nozzle for cleaning a card cylinder and doffer cylinder, etc. having an opening to the atmosphere into and through which a stream of air is adapted to be pulled or sucked when the valve in the branch pipe 6 associated therewith is opened. Located in main pipe 5 between pump 1 and branches 6 is a waste receiver 8 which removes waste which is sucked into the piping system by such stream.

The various elements of the system heretofore described are conventional except for valve unit 4 which is made up of a cylindrical housing 10 and a valve assembly 12 (see Fig. 3) within this housing and is so connected in a vertical position to the discharge of pump 1 that the flow of air from the discharge connection of pump 1 through the valve device 4 is upward as indicated by the arrow.

Housing 10 has an inlet connection 13 at the bottom thereof which is made of a size suitable for direct assembly to the discharge connection of multi-stage centrifugal pump 1. This inlet connection 13 is integral with outwardly dished bottom 14 having an annular flange 15 to which is attached by means of bolts 16 and L-shaped ring 17, a cylindrical casing 18 to the top of which is attached by means of bolts (not shown) and an L-shaped ring like 16 and 17 respectively, outwardly dished top 19 which has integral therewith a gas outlet 20. Welded to the top concave surface of bottom 14 is a short piece of valve support tubing 21 on which the valve assembly 12 is mounted as described hereafter. Housing 10 serves to direct the flow of air into and out of the valve assembly 12.

The valve assembly 12 shown in detail in Fig. 4 consists of a movable valve 40 having a valve disc 70, cylinder 72 and cylinder cover 76, and a stationary main body casting 24, having a yoke 36, rod 41 and piston 50 rigidly attached thereto.

Body 24 is mounted on tube 21 by means of split collar 22 adjustably clamped around tube 21 in any vertical position desired and screws 23 passing into threaded apertures 25 in a plurality of thickened bolt receiving ears 25a spaced around the lower periphery of body 24 and comprises a cylindrical portion 26 extending upwardly into an outwardly flared inverted conical shaped portion 27, which has a flange 28 extending outwardly from the upper portion thereof. The top surface 28a of flange 28 is machined flat to form a suitable valve seat for the lower surface 71b of portion 71 of valve 40. Body 24 is provided with a plurality of vertical strengthening ribs 29 on the outer surface thereof and the passage through body 24 comprises a cylindrical lower portion 30 for receiving the upper part of support tube 21 and an upper outwardly flared inverted conical shaped portion 31 separated from portion 30 by an inwardly extending ridge 32 having a cylindrical inner surface 33 of a diameter equal to the inner diameter of tube 21. Wedged between the bottom of body 24 and the top of collar 22 is a rubber sealing ring 34.

When body 24 is securely bolted to collar 22, which is clamped to the periphery of tube 21 in any vertical position desired, the top portion of tube 21 is received in passage 30 with the ledge 35 under ridge 32 resting against the top edge of tube 21 and with resilient ring 34 slightly compressed. Tube 21 has a diameter which closely approximates the diameter of the pump outlet and consequently which is sufficiently large to accommodate the maximum flow rate which the pump is capable of handling.

Yoke 36 is rigidly attached at its lower ends to two diametrically opposed ears 37 (Fig. 3) extending outwardly from and integral with, flange or valve seat 28, by means of a pair of screws 38. Rod 41 (Fig. 4) is securely fixed in a vertical stationary position to top hub 45 of yoke 36 by means of upper reduced portion 42, the top part of which is threaded at 43, shoulder 44 formed by the juncture of the reduced portion 42 and the main portion 41, aperture 46 in hub 45, washer 49, split lock washer 48 and nut 47. A piston 50, having an annular channel 52 in the top thereof defined by the peripheral surface of central hub 54 and the inner cylindrical surface of wall 53a is pressed onto rod 41 in the position shown with the top surface of hub 54 in contact with the underside of shoulder 41a which is integral with rod 41. Bottom wall 53 has a restricted drilled, oil by-pass hole 55 therethrough about 1/32 of an inch in diameter and a larger oil by-pass hole 56 about 1/4 inch in diameter, the diameter of piston 50 being about 4 inches.

One end 57a of a thin, flat tempered flexible reed 57 of a width that exceeds the diameter of hole 56 is fastened by nuts and bolts 58 to the machined underside 62 of the piston 50 with its other free end 57b covering hole 56. Two flat ends 60a and 60c respectively of a reed guard 60 of the same width as the reed 57 and having a central dished out portion 60b to limit the downward movement of end 57b of reed 57, are fastened to the underside 62 of piston 50 by means of nuts and bolts 58 and 61 respectively. Reed guard 60 protects the reed from any physical damage from excessive bending in a downward direction.

Rod 41 extends downwardly into, and piston 50 is located in, cylinder cavity 72a of cylinder 72, which, together with valve disc 70 and cylinder cover 76 make up valve 40. Cylinder cavity 72a is defined by cylindrical wall 72b rising vertically upward from and integral with the upper surface of valve disc 70, which has the shape of an inverted hollow cone with concave walls and a vertical center line coinciding with the vertical center line of tube 21, and which lies with its apex 88 upstream of valve seat 28 and within the passage formed by the passage in tube 21 and the passage in body 24. The lower surface 71b of the flared out upper peripheral portion of valve disc 70 cooperates with surface 28a of valve seat 28 by moving toward and away therefrom when the disc 70 is moved downwardly and upwardly respectively to control the amount of gas passing through the valve assembly 12 in the normal direction of gas flow as shown by the arrows. Disc 70 and cylinder 72 are provided with strengthening ribs 74 and disc 70 has an internal hub 85 extending from the apex 88 thereof into cylinder cavity 72a, such hub 85 having a passage 86 passing thereinto which is is provided with a bushing 87, which slidably receives the lower end of rod 41. The bottom of cylinder cavity 72a is formed by the upper sloped surface 89 of the bottom portion of inverted conical valve disc 70. The outer peripheray of hub 85 and surface 89 form an annular trough which comprises the bottom portion of cylinder cavity 72a.

Cylinder cover 76, having a central upwardly extending rod receiving hub 77 and a central downwardly extending hub 76b and a passage passing centrally therethrough, such passage comprising an upper, wider portion 77a and a narrower lower portion 77b provided with a bushing 80 for slidably receiving rod 41, is attached to cylinder wall 72b by means of a plurality of threaded screws 75, gasket 75a and threaded passages 75b in protruding ears 73 spaced around the periphery of cylinder wall 72b. Dust wiper 78 and oil seal 79 for rod 41 are provided in passage 77a. Cover 76 has a depending cylindrical wall 76a which extends downwardly therefrom, which is snugly received by the top portion of the inner surface of cylindrical wall 72b and which together with hub 76b forms an annular channel 81 in the bottom face of cover 76. Cover 76 is provided with a pad 83 having a portion extending upwardly from cover 76, a portion extending downwardly from cover 76 and an oil inlet passage 82 passing vertically therethrough. The top portion of passage 82 is threaded for receiving oil filler plug 84. An oil drainage passage 84a passes through cover 76 between passage 77a and the cylinder cavity 72a.

Oil by-passage 41b passes through rod 41 as shown connecting passage 86 with cylinder cavity 72a.

Cylinder cavity 72a is filled with oil 90 through passage 82 to a level 91 slightly above the top of stationary piston 50. The downwardly extending portion of pad 83 is so designed that the bottom thereof lies on the level which is the proper oil level when the valve 40 is in the fully closed position shown in full lines in Fig. 4 with surface 71b of portion 71 in contact with surface 28a, so that by adding oil with the valve 40 in such position until the oil is level with the bottom of pad 83 the proper oil level is established within the cylinder cavity 72a, leaving an air space 92 which contains compressible air. This air space permits thermal expansion of the oil 90 and provides for displacement of the oil by rod 41 when the valve assembly 40 comprised of the valve disc 70, valve cylinder 72 and cover 76 rises with relation to rod 41 and piston 50.

When the cylinder cavity 72a is being filled with oil, a stick or rod is inserted through hole 82 to force the free end 57b of reed 57 away from hole 56 so the oil above hole 56 will flow into that part of the cavity 72a below piston 50.

Cylinder 72, disc 70 and cover 76 are all attached to each other and are adapted to move as a unit upwardly and downwardly with relation to stationary piston 50 and rod 41 from the position shown in full lines in Fig. 4, in which position the surface 71b of disc 70 engages surface 28a of valve seat 28 and the valve is in fully closed position, to the position shown in dotted lines in Fig. 4, in which position the valve is in a fully open position. The valve assembly 12 is so designed that when valve disc 70 is in the full open position, as shown, gas can pass through the valve opening between surface 71b and 28a at a rate at least equal to the maximum rate which the pump is capable of handling.

Movement upwardly of valve 40 forces oil 90 under piston 50 to flow through restricted hole 55 to the top side of the piston. The valve 40 cannot move upwardly any faster than the flow of oil through restricted passage 55 permits. The upwardly pressure applied on reed 57 by the oil 90 due to this upward movement of valve 40 causes end 57b of reed 57 to be forced to the position shown in full lines in Fig. 6, which prevents any flow of oil through larger passage 56. Thus, the rate of movement of valve 40 upwardly depends upon the rate at which oil can flow through restricted opening 55, which, of course, depends upon the cross sectional size of such opening. This restricted flow of oil dampens the upward movement of valve 40.

Upon downward movement of valve 40, the oil on the top side of piston 50 is forced through both holes 55 and 56 because the downward pressure of the oil caused by such movement causes free end 57b of reed 57 to be forced away from the bottom 62 of piston 50, thereby permitting oil to flow through hole 56 and practically the free flow of oil from the top of the piston to the bottom of the piston takes place.

Since hole 56 and reed 57 permits practically a free flow of fluid from the upper side of piston 50 to the lower side thereof on downward movement of valve assembly 40, there is very little dampening of this movement.

Hole 55 is only 1/8 the diameter of hole 56 and since the areas of such holes are as the square of their diameters the area of small hole 55 is only 1/64 the area of larger hole 56. Not considering friction, the rate of flow is in proportion to area. Thus, the hydraulic dampening action created will for a given upward force allow a rate of upward movement of the disc 70 which is only 1/65 the rate of its downward movement when acted upon by an equal downward force.

If the cylinder cavity was completely filled with oil, which is practically incompressible, valve 40 could not be moved upwardly.

In operation the flow of air into the valve assembly in the direction shown by the arrows from the discharge connection of the multi-stage centrifugal exhauster 1, to which it is directly connected, acts on the under side of the disc 70 to maintain it away from valve seat 28, the particular distance which it is held away from seat 28 and consequently the rate of flow through valve assembly 12 depending upon and corresponding with the rate of flow through pump 1 into the valve assembly which in turn depends and corresponds with the total rate of flow into branch pipes 6, which in turn depends on and corresponds with the number of valves 7 which are open. If the rate of flow through the system and into the valve assembly is increased by opening more valves 7 the pressure of the flowing air under the disc 70 at that increased rate is greater than the weight of the valve 40 and the air pressure in the housing 10 and the disc 70 will be lifted upwardly an added amount to increase the area of flow through the valve assembly 12 (distance between 71b and 28a). This increase in area allows a greater amount of air to flow through valve assembly 12 into the housing 10, which increases the pressure in the housing. When the pressure in the housing 10 plus the weight of the movable valve assembly becomes equal to the increased pressure under the valve disc 70, upward movement of disc 70 will stop and it will remain at that lift, the area now being large enough to satisfy the increased amount of air flowing into the valve and thereby permitting a rate of flow therethrough corresponding to the increased total rate of flow into branches 6. Should the flow of air through the system into the valve be decreased by closing a valve 7 and consequently decreasing the total rate of flow into pipes 6, then the pressure under the disc 70 is decreased and it will be lowered by its own weight toward seat 28 to the position where the air pressure under the disc 70 at the reduced rate is equal to the air pressure in the housing plus the weight of the valve assembly. At this position the distance between 71b and 28a is such that the rate of flow through valve assembly 12 corresponds to the decreased total rate of flow into pipes 6. Thus, the valve is capable within itself of automatically varying the flow rate therethrough in response to and to accommodate a varying flow condition through the pump 1 into the valve assembly 12 and consequently a varying total flow rate into pipes 6. The air pressure under the disc will always be slightly more than the air pressure in the housing because a small amount of pressure differential is required to overcome the weight of valve 40.

Although an increase in total rate of flow into pipes 6 will eventually move valve 40 upwardly to a position at which the rate of flow through valve assembly 12 will correspond to the increased total rate the hydraulic dampening action of the oil resisting the upward movement of valve 40 will cause a time interval to elapse before this position is reached. During this time interval the valve assembly 12 will not permit the increased flow to pass therethrough because the valve opening is not yet large enough to accommodate it. Consequently the increased flow is throttled by the valve assembly until valve 40 has had time to move upwardly far enough to accommodate it. At the initiation of the flow increase it is entirely throttled but as the valve 40 moves upwardly to increase the size of the valve opening less and less of the increase is throttled until when the valve 40 reaches the position which will accommodate the increased flow none of it will be throttled. This occurs only if the increased flow is sustained during this entire time interval. However, if it is not sustained and the rate drops back to what is was originally before valve 40 can move up sufficiently to accommodate it, such increased flow never does pass through the valve assembly. The sudden increases in flow rate caused by forward surges ordinarily developed by pump 1 when operated in the surge zone are so short lived that they subside before the valve disc 70 has had time to move any substantial distance to accommodate them. The effect is that these forward surges of residual air are throttled. Because the system is a pneumatic system, this throttling or resistance to the flow of forward surges through the valve assembly 12 resists or throttles the creation of forward surges by the pump thereby preventing such surges from developing. In other words, the forward surges are choked or held back because the throttling of the surges at the valve assembly 12 throttles the surges throughout the entire system. This prevents surges in a reverse direction because, as described above, the latter occur only when the former occur.

Consequently, the flow rate through the pump is stabilized or leveled off to a substantially constant rate which is substantially equal to the total rate of flow through the openings which in turn is equal to the mean rate of flow through the pump.

In effect, the hydraulic resistance to upward movement of disc 70 throttles the surges at any particular load in the surge zone just as though valve assembly 12 were a hand operated, positive acting throttle valve closed sufficiently to eliminate surging at that particular load. However, unlike a hand operated throttle valve, if the load is increased by opening more valves 7 to thereby increase the total flow into pipes 6 and the mean rate of flow through the pump 1, the valve disc 70 will automatically move further away from seat 28 to permit a corresponding increase in flow through the valve assembly 12 to accommodate this increased mean rate of flow through the pump and system. This is true because, although the hydraulic action of the oil resists upward movement of valve disc 70 sufficiently to throttle surges, sustained increases in flow rate through the pump, which are brought about by increasing the mean flow rate cause the disc 70 to gradually move upwardly to a position at which the same increase in flow is permitted to pass through the valve assembly, whereby such increased load or increase in mean rate of flow is accommodated. However, forward surges at such increased mean rate are eliminated as described above because the larger opening of the valve assembly 12 between 71b and 28a, although accommodating the increased mean or steady rate of flow will throttle or resist forward surges above such mean rate of flow and consequently prevent them from occurring.

Although when the mean rate of flow is decreased by closing a valve 7 the valve moves quickly toward seat 28 until it reaches a position in which the valve opening is just large enough to permit a rate of flow therethrough corresponding to the decreased mean rate of flow, the opening is small enough to choke or throttle forward surges at that decreased mean rate or load.

The weight of valve 40 causes it to drop quickly when the pressure thereunder is released by reduction in flow rate caused by closing a valve 7 because there is very little hydraulic resistance to movement thereof in a direction toward the valve seat 28 due to the fact that during movement in this direction reed 57 is forced away from the bottom of hole 56 and oil is free to move therethrough from the top to the bottom of the piston as well as through aperture 55.

It is necessary for the valve 40 to move down quickly in this manner because, if it does not, the valve opening, although small enough to throttle forward surges at the greater load is not small enough to throttle the surges developed at the decreased load and surging occurs. In the event that the valve disc 70 does not move downwardly fast enough to prevent forward surge the initiation of the resulting backward rush of air caused by the surge in a reverse direction will aid the weight of the valve and cause faster movement of the valve disc 70 toward seat 28, thereby reducing the back flow of gas through the valve assembly.

If a large volume of air is flowing into pipes 6 and all the valves 7 are suddenly closed so that flow is 0, disc 70 which was lifted off its seat to accommodate the large flow, would, by the initiation of the back rush of surging air which would be substantial in such case, be dropped quickly onto its seat and snuff out the backward surge. Consequently, the only gas which moves backwardly through the pump under such circumstances is that contained in the small conduit volume between the pump 1 and the valve assembly 12. However, the valve unit 4 is positioned closely enough to the discharge of the pump 1 so that this volume is so small that not enough air is contained therein to cause any appreciable noise by the back rush thereof and no "shriek" will result. Thus, although valve assembly 12 ordinarily prevents surges from occurring, if there is such a sudden decrease in load that the valve assembly is not quick enough to respond to such decrease before a substantial surge is developed, the valve disc 70 will, upon the initiation of the following backward surge, close quickly enough to prevent "shriek."

Although the drawings show the use of the valve unit 4 of the present invention at the discharge of a multi-stage centrifugal gas pump in a vacuum piping system wherein the pump acts as an exhauster, it is equally effective in a pressure system wherein the pump acts as a blower and can also be used effectively with any nonpositive displacement gas pump for pumping gas which has the characteristic of developing surges at reduced loads, as for example an axial flow fan-type pump used in wind tunnels or other conduit system. Furthermore, the valve unit 4 can be located at the inlet of the pump, because the throttling of surges at that position throttles the surges throughout the entire system. Furthermore, any dampening means may be used rather than the hydraulic dampening means disclosed so long as the upward movement of valve 40 is dampened sufficiently to throttle forward surges and so long as valve 40 is free to move quickly toward valve seat 28. The cylinder can be stationary and the piston can move with the valve and the valve disc can be of any shape desired.

The "mean rate of flow" of any particular pump at any particular load within the surge zone can be measured by inserting between the pump discharge and the valve assembly 12 a full open hand operated, positive, throttle valve and holding the valve assembly 12 in its full open position by means of a wedge between disc 70 and seat 28. Surging will occur as evidenced by a flow meter and/or "shriek." The hand operated throttle valve is then closed until surging is substantially eliminated as evidenced by the disappearance of "shriek" or surges in the flow meter. The flow rate through the hand operated throttle valve and through the system at that time is the "mean rate of flow" through the pump and system and into the valve assembly 12 at that particular load with that particular condition of the openings into the system. Although the flow rate through the system at that time is substantially constant it may, due to certain circumstances, vary slightly above and below a norm. In such case, the "mean rate of flow" is equal to such norm which is equal to the total flow rate into the pipes 6 at that time. If the number of open openings or number of open valves 7 is decreased so that the load and mean rate of flow is decreased, surging will again manifest itself because the opening of the hand throttle is not small enough to throttle surges occurring at that reduced load and mean rate. By closing the hand throttle by hand until the surging is again substantially eliminated as evidenced either by the instrument or by elimination of "shriek," the rate of flow through the system at that time is the "mean rate of flow" for that particular reduced load and is equal to the total flow rate into pipes 6 at that time. If the load is increased by opening another valve 7 but it is still in the surge zone and the hand throttle is opened until "shriek" occurs, or until the flow instrument shows marked surging, and subsequently the hand throttle valve is closed by hand until the "shriek" or surging of the flow meter disappears, the rate of flow through the system at that time is the mean rate of flow through the system at that increased load, and is equal to the increased total flow rate into pipes 6.

If at any of the particular loads referred to above, the hand throttle valve is opened wide and the wedges are removed from between disc 70 and seat 28, valve 40 will automatically move to a position at which surging is eliminated and upon doing so the rate of flow through the system and into the pipes 6 will be substantially equal to the same mean rate of flow through the system that occurred at that load when such surges were eliminated by the hand throttle valve.

It is preferable to make hole 55 small enough so that sufficient dampening of upward movement of valve 40 is obtained to prevent it from being moved any appreciable amount by forward surges, whereby during operation at any particular load in the surge zone, disc 70 remains practically stationary. Under these conditions the surges are substantially completely throttled out. However, if hole 55 is made too small, disc 70 will move too slowly in response to increases in load or mean rate of flow and the valve will be too sluggish. On the other hand, if hole 55 is increased to a size larger than that at which the disc remains stationary, the forward surges cause some upward movement of the valve before they are dissipated, whereby the area between 71b and 28a is increased and part of the forward surges flow therethrough. If the size of hole 55 is only slightly larger than that at which the valve disc 70 remains stationary, the valve is moved upwardly only slightly by the forward surge and only a very small part of such surge flows through the valve as an increased forward flow, the majority of such surge being throttled. Because a slight part of the forward surge flows through valve assembly 12 in the form of increased forward flow, upon the termination of such increased forward flow, a slight decrease in rate of forward flow subsequently occurs of a magnitude and frequency proportional to the magnitude and frequency of the portion of the forward surge which is not throttled. This slight decrease in forward flow is the beginning of a backward surge which never actually materializes to the point where there is flow in a backward direction. If only a very small amount of the forward surge is not throttled then the reduction in rate of forward flow is very slight. Under such conditions, after termination of each forward surge during which valve 40 is moved slightly upwardly the subsequent slight reduction in forward rate of flow causes disc 70 to move downwardly slightly until the next forward surge moves it upwardly again. Thus the disc 70 continuously "hunts" upwardly and downwardly above and below the position it would occupy if the hole 55 were of such a size that the disc 70 is held stationary. The larger the hole 55 the less the dampening of upward movement of valve 40, the greater the amplitude of the "hunting" of valve 40, the less the surges are throttled and the more the undesirable effects.

Ordinarily it is desirable to throttle as much of the surges as possible. However, the hole 55 may be enlarged any amount desired to throttle as much of the surges as desired so long as it is small enough to throttle a sufficient amount of the surges to prevent surge effects which are undesired. The maximum size of hole 55 and hence the minimum dampening of upward movement of valve 40 is dictated by the maximum amount of surging effect which can be tolerated under any particular circumstances.

In practice with an SAE 30 weight turbine spindle oil, the cross sectional area of such hole should not be so great that the cross sectional area of the bottom of the piston is less than 300 times the cross sectional area of such hole. When the cross sectional area of the piston is about 200 times the cross sectional area of hole 55, sufficient surging occurs to cause many undesirable effects but even then there is some throttling of the surges and hence some reduction in surge and elimination of undesirable effects although not enough for practical use under most conditions whereas when the cross-sectional area of the piston is about 400 times the cross-sectional area of hole 55, the valve is stable enough to be of practical use under most conditions. In the drawings with a hole 55 of $\frac{1}{32}$ of an inch and a piston diameter of 4 inches, the cross sectional area of the piston is 16,384 times the cross sectional area of hole 55. When a hole $\frac{3}{64}$ inch in diameter is used with a 4 inch piston and the cross sectional area of the piston is about 7,500 times the cross sectional area of hole 55, there is no "hunting" of valve 40. In practice, the cross sectional area of the piston should not be any greater than 20,000 times the cross sectional area of passage 55 because the valve 40 becomes too sluggish and responds too slowly to increases in load. Of course, if a heavier weight oil is used of greater viscosity than the oil referred to above then the ratio of the cross sectional area of the bottom of the piston to the cross-sectional area of the hole 55 must be reduced to obtain the same dampening effect whereas if a lighter weight oil of lesser viscosity is used such ratio must be increased to obtain the same dampening effect. The increase or decrease in such ratio to obtain the same dampening effect varies in accordance with the decrease and increase respectively in viscosity of the oil.

The size of the hole 56 should not be so small as to cause enough dampening of downward movement of valve 40 to interfere with quick and immediate response of such valve to decreased flows and initiation of backward flow. However, it can be as large as desired so long as it prevents valve disc 70 from banging against seat 28 with such force as to harm the parts and so long as it can be successfully closed during upward movement of the disc 70.

It is not intended that the invention claimed herein be limited in any manner to any theory set forth herein, such theory being advanced merely to aid in understanding such invention.

Furthermore, it is not intended that the invention claimed herein be limited in any manner by the descriptions and drawings hereof, such invention being limited only by the following claims and the equivalents thereof.

I claim:

1. A valve assembly comprising a valve seat, a valve movable upwardly away from and downwardly toward said valve seat over a range of positions from wide open to fully closed in response to variations in rate of gas flow into the valve assembly, hydraulic means for resisting the movement of said valve upwardly away from said valve seat means, said hydraulic means including a closed, hydraulic fluid cylinder containing hydraulic fluid, said cylinder comprising a cup-shaped member forming a part of said valve, said cylinder being hydraulic fluid-tight with respect to the main gas passage of the valve assembly, said hydraulic means also including a stationary piston which is adapted to be immersed in said hydraulic fluid and which is connected with a stationary piston rod extending downwardly into said cylinder, means for permitting substantially free flow of said fluid from the top side of the piston to the bottom side thereof on movement of said valve toward said seat, whereby said valve is relatively free to move toward said seat, but for permitting only a restricted rate of flow of fluid from the bottom side of said piston to the top side thereof on movement of said valve away from said seat means, whereby said movement of said valve away from said seat is resisted substantially more than the movement thereof toward said seat, said cylinder comprising a vertical wall rising from the valve disc, the valve disc forming the bottom wall of said cylinder, said valve disc having the shape of an inverted hollow cone, a flange extending outwardly from the base of the cone for engagement with said seat, the apex of the cone extending below said seat in an upstream direction, a hub extending upwardly from the apex of the cone and lying within the cone, said valve stem having a portion extending below the piston, one of said hub and said stem portion having a recess for receiving the other.

2. A valve assembly comprising a valve seat, a valve movable upwardly away from and downwardly toward said valve seat over a range of positions from wide open to fully closed in response to variations in rate of gas flow into the valve assembly, hydraulic means for resisting the movement of said valve upwardly away from said valve seat means, said hydraulic means including a closed hydraulic fluid cylinder containing hydraulic fluid, said cylinder comprising a cup-shaped member forming a part of said valve, said cylinder being hydraulic fluid-tight with respect to the main gas passage of the valve assembly, said hydraulic means also including a stationary piston which is adapted to be immersed in said hydraulic fluid and which is connected with a stationary piston rod extending downwardly into said cylinder, means for permitting substantially free flow of said fluid from the top side of the piston to the bottom side thereof on movement of said valve toward said seat, whereby said valve is relatively free to move toward said seat, but for permitting only a restricted rate of flow of fluid from the bottom side of said piston to the top side thereof on movement of said valve away from said seat means, whereby said movement of said valve away from said seat means is resisted substantially more than the movement thereof toward said seat means, said cylinder comprising a vertical wall rising from the valve disc, the valve disc forming the bottom wall of said cylinder, said means for permitting said flows of fluid including a first restricted passage through said piston permitting a predetermined restricted rate of flow of fluid therethrough and a second substantially larger passage through said piston, said second passage having a check valve therein permitting the flow of fluid therethrough only on movement of said valve toward said valve seat, the total resistance to movement of said valve by flow increases being substantially uniform over the range of movement of said valve, and means for blocking the escape of air at a predetermined liquid level in said cylinder so as to provide a predetermined air volume above the liquid.

References Cited in the file of this patent

UNITED STATES PATENTS

| | | |
|---|---|---|
| 781,200 | Hayden | Jan. 31, 1905 |
| 915,624 | Perkins | Mar. 16, 1909 |
| 919,606 | Locke | Apr. 27, 1909 |
| 1,005,005 | Dillon | Oct. 3, 1911 |
| 1,097,297 | Callan | May 19, 1914 |
| 1,097,298 | Callan | May 19, 1914 |
| 1,112,705 | Kinkaid | Oct. 6, 1914 |
| 1,202,082 | McCorkle | Oct. 24, 1916 |
| 1,498,226 | Beck | June 17, 1924 |
| 1,504,620 | Good | Aug. 12, 1924 |
| 1,874,135 | Spoor | Aug. 30, 1932 |
| 2,142,410 | Quick | Jan. 3, 1939 |
| 2,212,600 | Harm | Aug. 27, 1940 |
| 2,418,835 | Haugsted | Apr. 15, 1947 |

FOREIGN PATENTS

| | | |
|---|---|---|
| 13,196 | Great Britain | June 20, 1908 |
| 301,104 | Switzerland | Nov. 1, 1954 |